J. V. ROBINSON.
LOGGING SWIVEL JOINT.
APPLICATION FILED AUG. 20, 1909.

937,960.

Patented Oct. 26, 1909.

Witnesses
E. Larson
S. E. Dodge

Inventor
J. V. Robinson,
By Beeler & Robb
Attorneys

UNITED STATES PATENT OFFICE.

JOSEPH V. ROBINSON, OF SALEM, OREGON.

LOGGING SWIVEL-JOINT.

937,960.  Specification of Letters Patent.  Patented Oct. 26, 1909.

Application filed August 20, 1909. Serial No. 513,794.

*To all whom it may concern:*

Be it known that I, JOSEPH V. ROBINSON, a citizen of the United States, residing at Salem, in the county of Marion and State of Oregon, have invented certain new and useful Improvements in Logging Swivel-Joints, of which the following is a specification.

This invention relates to draft appliances for use in logging operations especially, although it is not to be limited in its use to any particular art.

More particularly stated, the invention consists of a novel form of a log chain swivel, having certain particular characteristics whereby it is better adapted for its uses than similar devices heretofore proposed.

For a full understanding of the invention, including its characteristic advantages, reference is to be had to the following detail description and the accompanying drawings, in which—

Figure 1:
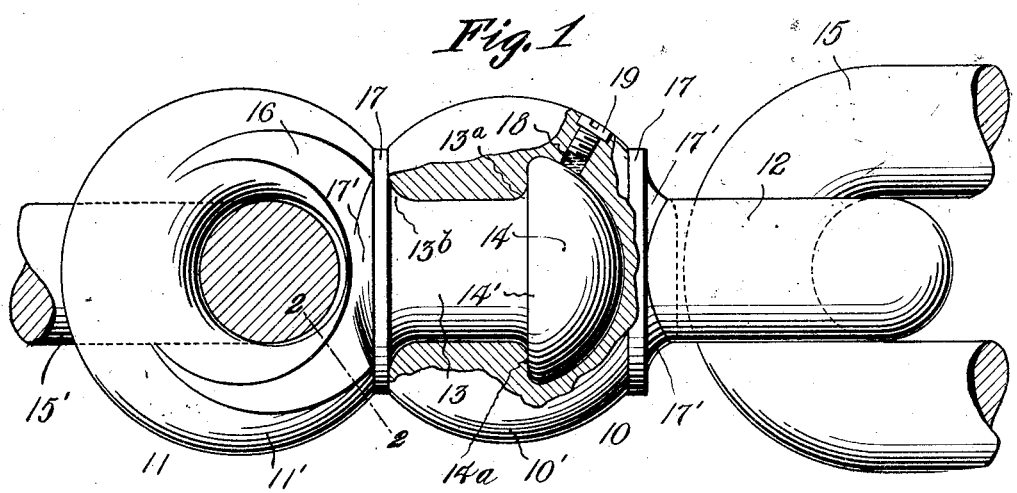
Figure 2:
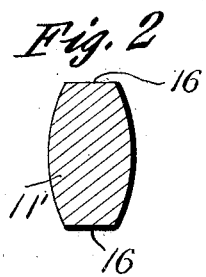

Figure 1 is a face view of the invention, partly broken away, and Fig. 2 is a cross sectional view substantially on the line 2—2 of Fig. 1.

Throughout the following description and on the several figures similar parts are referred to by like reference characters.

Referring particularly to the drawings the swivel comprises two principal parts, the body 10 and a companion member or eye 11. The body part consists essentially of a main hollow portion 10' which is substantially spherical and having an eye 12 integral therewith. The eye portion consists of an eye proper 11' and a shank or neck 13 integral with the eye 11' and having at its opposite end a head 14. The eye portions of the said two parts of the swivel are substantially of the same configuration and are adapted to be connected to chain links 15 and 15' or to any other suitable form of draft appliance, such as cables. That portion of each eye with which the chain links coöperate is substantially circular in cross section, so as to reduce friction to a minimum, and on the faces of the eyes may be formed flats 16 so as to add to the attractiveness of the appearance and to save any unnecessary expenditure of material.

The body and eye members of the swivel are assembled by compression under what is known as the drop forge process. The body 10' when hot is placed around the shank 13 and head 14 of the latter member when cold, and thereafter compression is applied to shape the body member 10' and to cause it to conform to the shape of the said shank and head. By this process of construction the body member consists of an integral structure and therefore it is impossible for it to become separated from the shank under ordinary circumstances. Each of said swivel members is reinforced at the point of connection between the eye thereof and the other part, at the point where the greatest danger of breakage exists, by a collar or rib 17 extending in a circular direction entirely therearound. Again, additional reinforcing means is provided between said rib 17 and the lateral faces of the eyes as indicated at 17', constituting lateral bracing means. The head 14 is preferably substantially spherical on the side opposite the shank, and the edge or rim of the head is beveled as indicated at 14', whereby the assembling process is facilitated, and furthermore where the head and eye are connected to the shank there are reinforcements $13^a$ and $13^b$, respectively. For a certain distance between the rim 14' and the reinforcement $13^a$ the head is flat, forming a shoulder $14^a$.

In the operation of the drop hammer the metal of the body 10' is drawn over or around the edge 14' of the head and snugly down against the full length of the shank, the rounded strengthening or reinforcing features $13^a$ and $13^b$ serving also as important means to cause said metal to snugly embrace the shank as indicated. That portion of the body 10' opposite the head 14 is maintained snugly against the spherical portion of the head, thereby insuring that the metal will be drawn over the edge 14' in the manner just stated. The extension or strengthening rib 17 on the shank member 11 serves two additional important functions,—to direct the metal downwardly snugly against the reinforcement $13^b$ and also as a bracing means tending to resist lateral distortion or strain on the joint when in use. In the finished article the body 10' has an intimate snug fit on every portion of the shank member inclosed thereby, and whereby the introduction of grit or moisture is prevented. The structure combines the maximum strength with the minimum of size, matters of extreme importance in a device intended for this purpose.

In order to provide an effective means for lubrication between the relatively movable parts of the swivel an oil pocket is provided at 18 in one side of the body member. When this cavity is filled with a heavy character of lubricant, the opening thereto is closed by means of a plug in the nature of a screw plug 19. All dust and dirt are practically excluded from the bearing and the parts remain lubricated for a long period of time.

The above described swivel may be made of any suitable metal and of the proportions best adapted to its uses. It is simple and compact in construction, and being small in proportion to its strength, is well adapted for coöperation with pulleys or other guiding devices.

Having thus described the preferred embodiment of the invention, what is claimed as new is:—

The herein described logging swivel comprising a hollow body member and a companion member having a shank and head snugly inclosed within the hollow body member and having integral attachment means, said shank having at each end, where it is attached to the head and attachment means, a rounded reinforce, said head having a beveled edge and a flat portion between said edge and the adjacent reinforce, forming a shoulder, and the shank member being provided with a circular outwardly extending collar constituting a brace for the adjacent end of the hollow body member, the metal of the said hollow body conforming snugly to all parts of the shank member inclosed thereby, substantially as set forth.

In testimony whereof I affix my signature in presence of two witnesses.

JOSEPH V. ROBINSON.

Witnesses:
 CALVIN T. MILANS,
 GEO. D. RILEY.